United States Patent Office 2,866,737
Patented Dec. 30, 1958

2,866,737

SIDE-CHAIN CLEAVAGE BY CYLINDRO-CEPHALUM AUREUM

Gilbert M. Shull, Huntington Station, N. Y., and John B. Routien, Tenafly, N. J., assignors to Chas. Pfizer & Co., Inc., Brooklyn, N. Y., a corporation of Delaware No Drawing. Application January 23, 1957
Serial No. 635,599

4 Claims. (Cl. 195—51)

This invention relates to the fermentation of steroids with a certain type of organism. A particular object of the invention is the conversion of progesterone or its 21-hydroxy derivative (desoxycorticosterone) to testosterone, a valuable medicinal hormone. Another object of the invention is the conversion of progesterone or its 21-hydroxy derivative to $\Delta^4$-androstene-3,17-dione, which in turn is a useful intermediate in the synthesis of testosterone. Other objects will be apparent from a study of the ensuing preferred embodiments of the invention.

It has been found that, when progesterone, 21-hydroxyprogesterone, or a lower alkanoyl ester of the latter is contacted in a fermentation medium with a growing culture of an organism of the species *Cylindrocephalum aureum*, the C–17 side chain of the steroid is cloven. A mixture of testosterone and $\Delta^4$-androstene-3,17-dione is thus obtained, from which the two desired products may be separated by conventional paper chromatography, fractionation on a silica gel column or like techniques. The androstenedione may be converted to testosterone, if desired, by known means, for instance by Mamoli's microbiological method wherein the 17-keto group is simply reduced with fermenting yeast. (See Fieser et al., "Natural Products Related to Phenanthrene," 3d ed., 1949, page 371.)

Cultures of *Cylindrocephalum aureum* may be isolated from various sources such as soil. The organism is of the order Moniliales in the class Fungi Imperfecti. In operating the new process it is generally preferred to add the steroid substrate to the fermentation after growth of the organism has been well established. Alternatively, however, the steroid may be added to the nutrient medium at the start of the growth period; or the developed mycelium may be separated from the fermentation and added to the steroid in a simple aqueous medium. Any one of these three methods will effect the desired cleavage of the progesterone or 21-hydroxyprogesterone side chain at C–17.

When an ester of 21-hydroxyprogesterone is used this is an ester of the steroid with a lower aliphatic acid such as acetic, propionic, butyric, or valeric acid, etc. having from one to six carbon atoms inclusive.

The *Cylindrocephalum aureum* growth and fermentation media can generally be the same, and may vary widely in constitution. A carbohydrate source, trace minerals and a source of nitrogen should be employed, as usual in mold fermentations. Treatment of the steroid substrate is best carried out at room or slightly higher temperatures, e. g. 20°–35° C. Standard surface fermentation or submerged aerobic fermentation techniques may be used. The proportion of steroid substrate should generally range from about 0.01 g./l. to about 5 g./l. The actual amount utilized for conversion to the desired product will vary somewhat with the length of fermentation, the medium, the organism, etc.

The following examples are given by way of illustration only, and are not to be regarded as limitations of this invention, since many variations are possible without departing from the spirit and scope hereof.

*Example I*

A Fernbach flask containing 1000 cc. of a medium of the composition indicated below was inoculated with a suspension of spores and vegetative growth scraped from a slant culture of *Cylindrocephalum aureum* QM 610, obtained from the U. S. Army Quartermaster Corps collection at Natick, Massachusetts (see also Saccardo, "Syllogue Fungorum," vol. 4, p. 63 (1886).

|  | G. |
|---|---|
| Malt extract (Difco) | 50 |
| Sucrose | 10 |
| $NaNO_3$ | 2 |
| KCl | 0.5 |
| $MgSO_4 \cdot 7H_2O$ | 0.5 |
| $FeSO_4 \cdot 7H_2O$ | 0.01 |
| $K_2HPO_4$ | 1.0 |
| $H_2O$ to 1000 cc. | |

After shaking on a rotary shaker at 28° C. for 48 hours, 100 cc. of the resulting vegetative growth was used to inoculate each of five fermentors containing 2000 cc. of the same medium. These fermentors were stirred at about 1700 R. P. M. and aerated at a rate of approximately one volume of air per volume of medium per minute. The temperature of the fermentation was maintained at 28° C. After a period of 24 hours 500 mg. of progesterone was added (dry) to each fermentor and the fermentation allowed to continue for an additional 30½ hours.

The whole broth from the five fermentors was combined and extracted three times with equal volumes of chloroform. Paper chromatography of the combined $CHCl_3$ extracts, after concentration, showed the presence of two transformation products as well as unreacted progesterone. Quantitative assay of these steroids gave the following values: 1,275 mg. of progesterone, 600 mg. of a compound with the same mobility as $\Delta^4$-androstene-3,17-dione and 250 mg. of a compound with the same mobility as testosterone.

The most polar compound was separated from the other two by fractionation on a silica gel column with ethanol as the stationary phase and 1% ethanol in methylene chloride as the mobile phase. The crystalline compound was identical in all respects to an authentic sample of testosterone.

Separation of progesterone and the other transformation product was achieved by chromatography on an activated alumina column. The column was developed with hexane; ether (19:1). The transformation product was identical in all respects with an authentic sample of $\Delta^4$-androstene-3,17-dione.

*Example II*

The procedure of Example I was repeated, this time employing another organism deposited in the American Type Culture collection and identified as *Cylindrocephalum aureum* ATCC 12,721.

With this culture the results of Example I were again realized. Crystals of testosterone and $\Delta^4$-androstene-3, 17-dione were recovered.

*Example III*

The procedure of Example I was repeated using 21-hydroxyprogesterone in place of progesterone as the substrate. The steroid was used at a level of 0.50 g. per liter of medium. The products testosterone and $\Delta^4$-androstene-3,17-dione were isolated.

*Example IV*

The procedure of Example I was repeated using the propionate of 21-hydroxyprogesterone as starting material at a concentration of 250 mg./l. of fermentation medium. The same products were isolated.

A culture of the organism referred to above as *C. aureum* QM 610 has been deposited at the American Type Culture Collection under the number ATCC 12720.

What is claimed is:

1. A process for cleaving the C-17 side chain of a compound chosen from the group consisting of 21-hydroxyprogesterone, a lower alkanoyl ester of 21-hydroxyprogesterone and progesterone, which comprises contacting said compound in an aqueous medium with a growing culture of an organism of the species *Cylindrocephalum aureum*.

2. A process which comprises growing an organism of the species *Cylindrocephalum aureum* in an aqueous nutrient medium containing a compound chosen from the group consisting of 21-hydroxyprogesterone, a lower alkanoyl ester of 21-hydroxyprogesterone and progesterone, and recovering the testosterone and $\Delta^4$-androstene-3,17-dione thereby produced.

3. A process according to claim 2 wherein the organism is *Cylindrocephalum aureum* ATCC 12720.

4. A process according to claim 2 wherein the organism is *Cylindrocephalum aureum* ATCC 12721.

References Cited in the file of this patent

UNITED STATES PATENTS

| 2,721,828 | Murray | Oct. 25, 1955 |
| 2,762,747 | Murray | Sept. 11, 1956 |

OTHER REFERENCES

Experientia, vol. IX, No. 10, 1953, pages 371–372.

Jour. Am. Chem. Soc., vol. 76, 1954, pages 4050–4051.